(12) United States Patent
Yamaguchi et al.

(10) Patent No.: US 6,790,025 B2
(45) Date of Patent: Sep. 14, 2004

(54) EXTRUSION MOLDING APPARATUS

(75) Inventors: Satoru Yamaguchi, Anjo (JP); Hiromi Katou, Kuwana (JP); Yasunao Miura, Nagoya (JP)

(73) Assignee: Denso Corporation, Kariya (JP)

( * ) Notice: Subject to any disclaimer, the term of this patent is extended or adjusted under 35 U.S.C. 154(b) by 29 days.

(21) Appl. No.: 09/852,917

(22) Filed: May 11, 2001

(65) Prior Publication Data

US 2002/0015750 A1 Feb. 7, 2002

(30) Foreign Application Priority Data

| May 12, 2000 | (JP) | 2000-140212 |
| Dec. 4, 2000 | (JP) | 2000-368916 |
| May 9, 2001 | (JP) | 2001-139178 |

(51) Int. Cl.[7] ............................................. B28B 3/26
(52) U.S. Cl. ..................... 425/198; 425/199; 425/204; 425/205; 425/208; 425/380; 366/82; 366/88; 366/89
(58) Field of Search ............................. 425/197, 198, 425/199, 204, 205, 208, 380; 366/82, 88, 89

(56) References Cited

U.S. PATENT DOCUMENTS

| 3,685,804 A | * | 8/1972 | Stansfield | 366/75 |
| 4,136,969 A | * | 1/1979 | Meyer | 366/88 |
| 4,729,666 A | * | 3/1988 | Takubo | 366/343 |
| 4,839,120 A | * | 6/1989 | Baba et al. | 264/102 |
| 5,055,027 A | * | 10/1991 | Sato | 425/197 |
| 5,064,586 A | * | 11/1991 | Higashijima | 264/40.6 |
| 5,980,227 A | * | 11/1999 | Murata et al. | 425/144 |

* cited by examiner

*Primary Examiner*—Robert Davis
*Assistant Examiner*—Joseph S. Del Sole
(74) *Attorney, Agent, or Firm*—Harness, Dickey & Pierce, PLC

(57) ABSTRACT

An extrusion molding apparatus capable of improving the extrusion rate of the ceramic material without a major reconstruction of a drive system is disclosed. The extrusion molding apparatus comprises screw extruders (2, 3) including housings (29, 39) having screws (4, 5) built therein, wherein the ceramic material introduced into the housings (29, 39), respectively, is extruded by way of the forward end extrusion ports by rotating the screws (4, 5). The screws (4, 5) built in the screw extruders (2, 3), respectively, include pressure portions (41, 51) with the feed rate per revolution progressively decreased toward the forward end extrusion port, and extended portions (43, 53) with the feed rate per revolution progressively increased toward the forward end extrusion port.

13 Claims, 8 Drawing Sheets

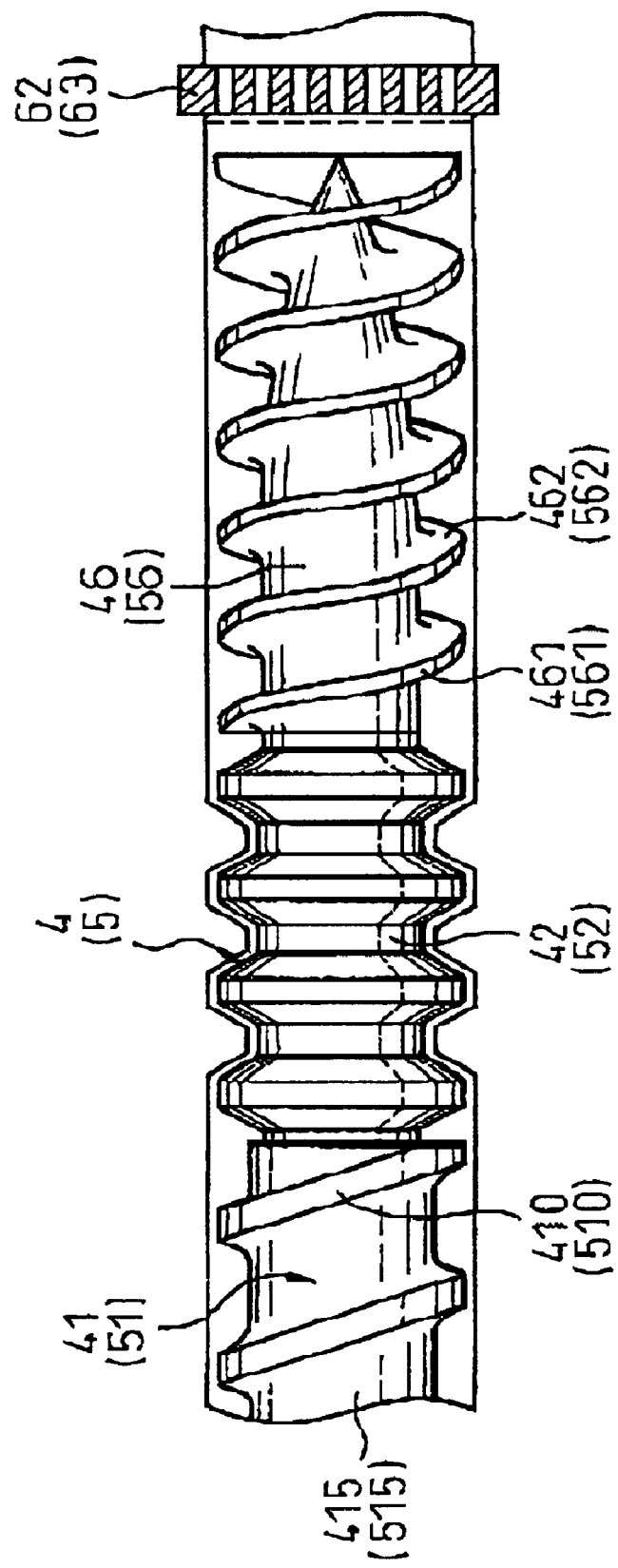

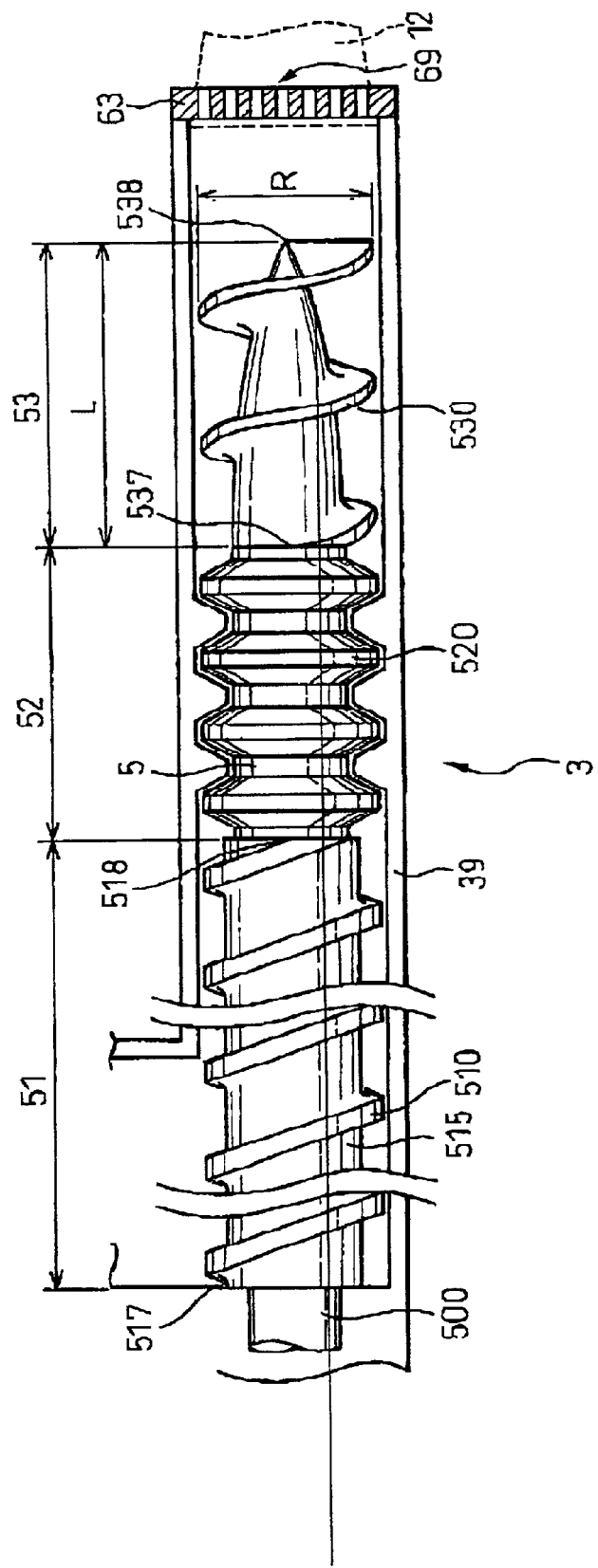

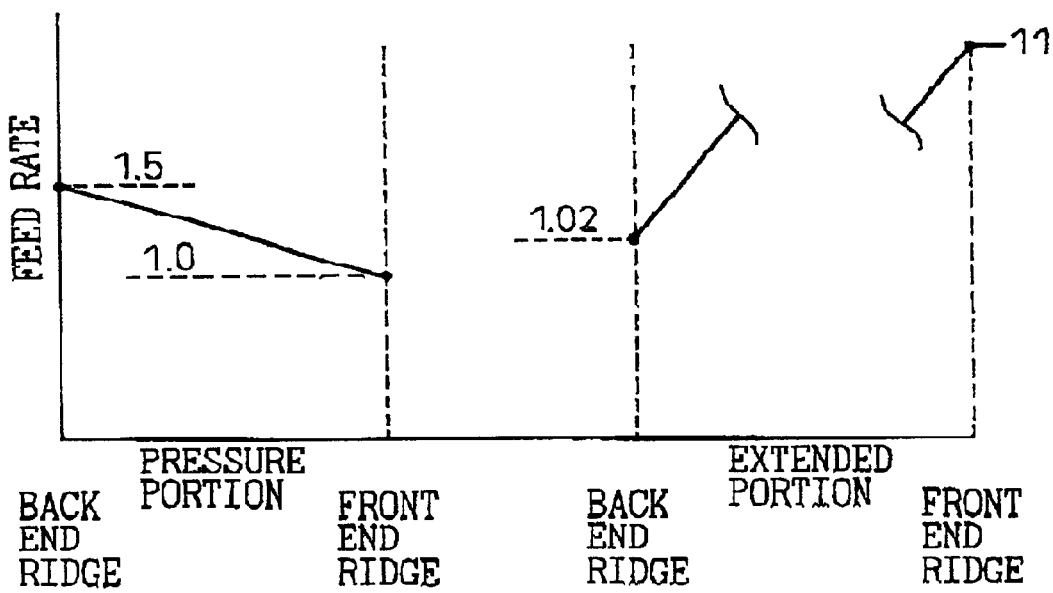
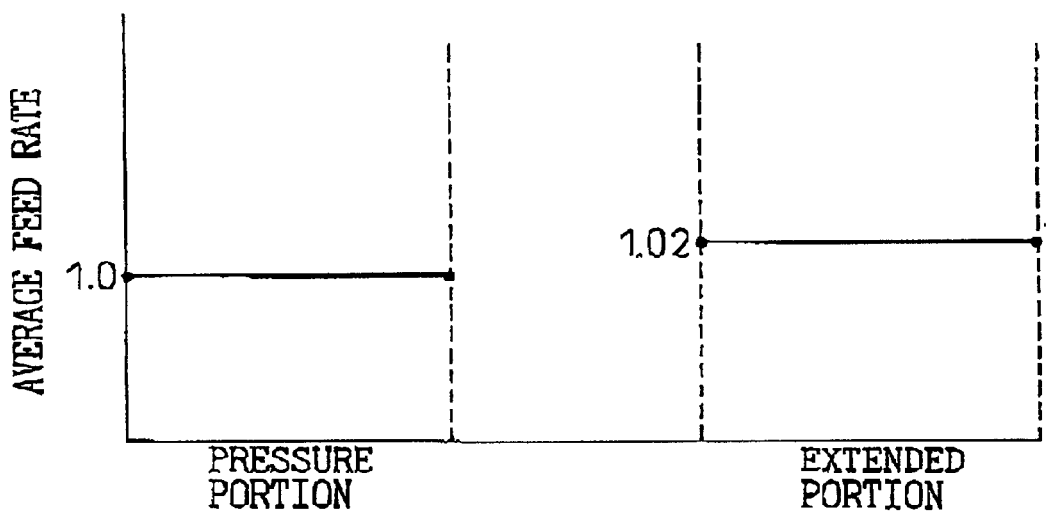

EXTRUSION MOLDING APPARATUS

BACKGROUND OF THE INVENTION

1. Field of the Invention

The present invention relates to an extrusion molding apparatus for molding a ceramic molded product such as a ceramic honeycomb structure.

2. Description of the Related Art

As shown in FIG. 9 described later, a ceramic honeycomb structure 8 having a plurality of cells 88 with partitioning walls 81 is used, for example, as a catalyst carrier in an exhaust gas purification system of an automotive vehicle. This honeycomb structure 8 is normally fabricated by extrusion molding.

A conventional extrusion molding apparatus 9 for a honeycomb structure, as shown in FIG. 10, for example, comprises a mold 11 for molding the honeycomb structure 8, and screw extruders 92, 93 in two stages, upper and lower, for kneading and extruding a ceramic material 80 continuously.

As shown in FIG. 10, the screw extruders 92, 93 include screws 94, 95 built in housings 929, 939 respectively. By rotating the screws 94, 95, the ceramic material 80 introduced into the housings 929, 939 is extruded by way of an extrusion port at the forward end thereof. The screws 94, 95 include pressure portions 41, 51 formed by spirally winding lead portions 410, 510, and kneading portions 42, 52 having a plurality of disk-shaped flange portions 420, 520, respectively, arranged in spaced relation along the axial direction. Conical forward end portions 945, 955 are arranged on the side of the kneading portions 42, 52 nearer to the forward end extrusion port.

The forward end extrusion ports of screw extruders 92, 93 have filters 62, 63, respectively. A mold 11 is arranged on the forward end port side of the lower screw extruder 93 through a resistance tube 12. The ceramic material 80 is extruded and molded as a honeycomb structure 8 from the mold 11.

The screw extruder may be arranged in a single stage or in three or more stages.

The conventional extrusion molding apparatus 9 described above poses the following problem.

Specifically, the rate at which the ceramic material 80 is extruded from each screw extruder 92, 93 is reflected in the rate at which a ceramic molded product, such as a honeycomb structure 8, is extruded. The higher the extrusion rate of the screw extender, the more efficiently the ceramic molded product can be fabricated.

The extrusion rate of the screw extruders 92, 93 can be increased by increasing the rotational speed of the screws 94, 95. To accomplish this, however, a considerable reconstruction of the equipment drive system is required and cannot be realized readily.

In view of this, development of a technique has been desired for increasing the extrusion rate of the screw extruder efficiently without substantially reconstructing the drive system.

SUMMARY OF THE INVENTION

The present invention has been achieved in view of the problem mentioned above, and the object thereof is to provide an extrusion molding apparatus which can increase the rate at which a ceramic material is extruded, without substantial reconstruction of the drive system.

BRIEF DESCRIPTION OF THE DRAWINGS

FIG. 2 is a diagram for explaining the screw structure according to a second embodiment.

FIG. 3 is a diagram for explaining the screw striker according to a third embodiment.

FIG. 4 is a diagram for explaining the feed rate of a pressure portion and an extended portion according to the third embodiment.

FIG. 5 is a diagram for explaining the average feed rate of the pressure portion and the extended portion according to the third embodiment.

DESCRIPTION OF THE PREFERRED EMBODIMENTS

Figure 1:
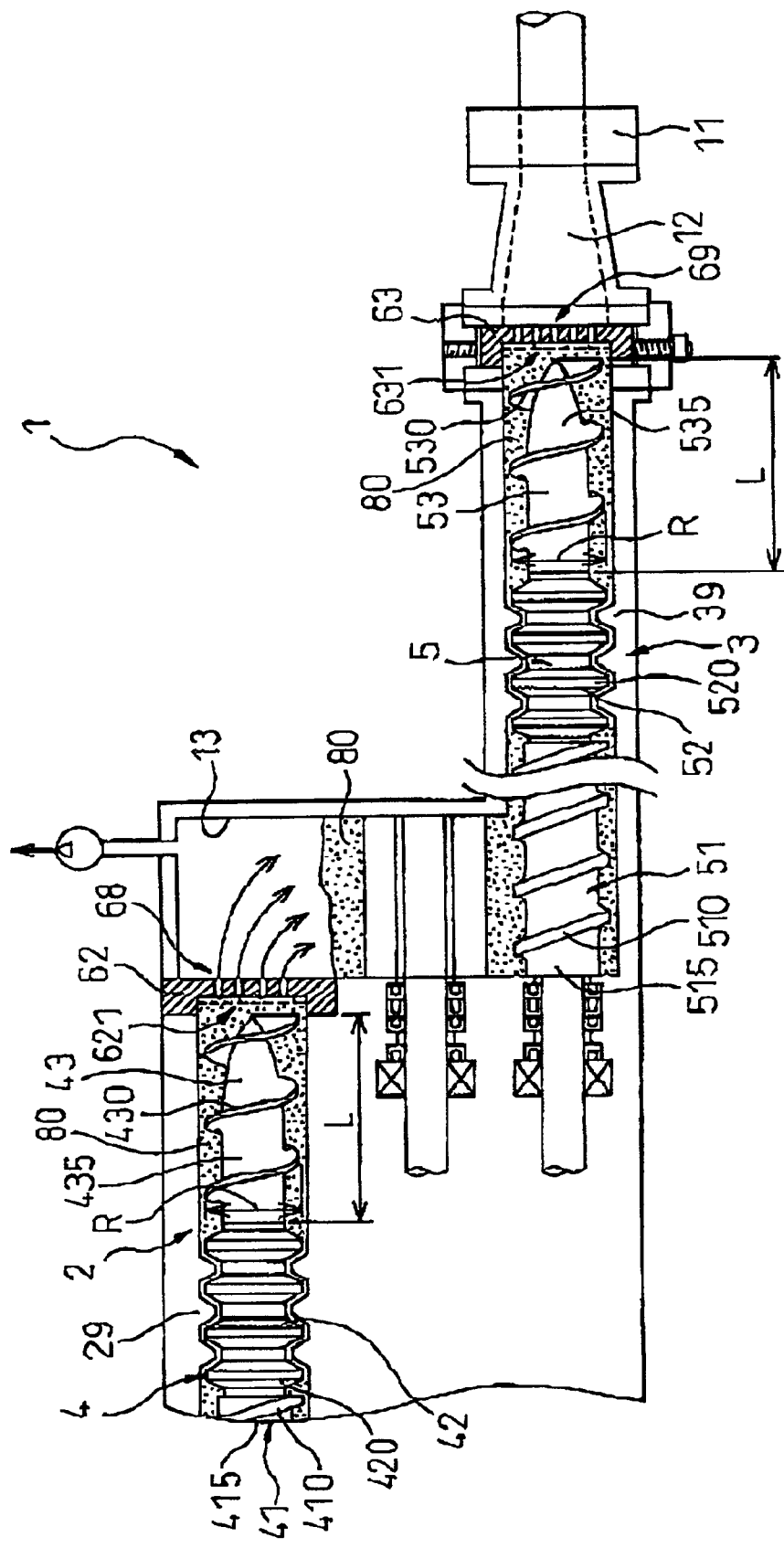
FIG. 1 is a diagram for explaining the structure of an extrusion molding apparatus according to a first embodiment of the invention.

According to a first aspect of the invention, there is provided an extrusion molding apparatus comprising a housing, and a screw extruder including at least a screw built in the housing, the ceramic material being introduced into the housing and extruded by way of a forward end extrusion port by rotating the screw, wherein the screw built in the screw extruder includes a pressure portion, an extended portion arranged on the forward end extrusion port side of the pressure portion, and a kneading portion arranged between the pressure portion and the extended portion for kneading the ceramic material.

The most noticeable point of this aspect of the invention is that the screw has the pressure portion, the kneading portion for kneading the ceramic material and the extended portion.

Now, the operation and effects of this invention will be explained.

According to this invention, the screw includes an extended portion downstream of a pressure portion and a kneading portion. As a result, the ceramic material that has been extruded from the pressure portion, when discharged from the kneading portion, is further extruded toward the forward end extrusion port positively by the extended portion. Thus, the rate at which the ceramic material is extruded by the screw extruder can be improved.

In this way, the ceramic material can be led smoothly to the forward end extrusion port. Also, the provision of the extended portion at the forward end potion of the screws achieves the aforementioned operation and effects and thereby eliminates an extensive reconstruction of the drive system.

According to this invention, therefore, there is provided an extrusion molding apparatus in which the extrusion rate of the ceramic material can be improved without a sizable reconstruction of the drive system.

The ceramic molded products obtained by the extrusion molding apparatus according to this invention include the honeycomb structure shown in the first embodiment, and sheets, round bars, pipes, and thin versions of these products, i.e. thin honeycomb structure, thin sheets, thin round bars and thin pipes.

According to a second aspect of the invention there is provided an extrusion molding apparatus, in which the pressure portion preferably has the feed rate per revolution progressively decreased toward the forward end extrusion port, while the extended portion preferably has the feed rate per revolution progressively increased toward the forward end extrusion port.

In the case under consideration, the pressure portion has the feed rate per revolution progressively decreased toward the forward end extrusion port, and the extended portion has the feed rate per revolution progressively increased toward the forward end extrusion port.

As a result, the ceramic material that has been pressured in the pressure portion can be smoothly led toward the forward end protrusion port. Therefore, the extrusion rate of the ceramic material can be improved. Also, the drive system requires no sizable reconstruction.

According to a third aspect of the invention there is provided an extrusion molding apparatus, wherein the relation L/R≧1.0 preferably holds and where R is the outer diameter of the extended portion and the L the length thereof.

In the case under consideration, the extended portion of a specific shape is arranged at the forward end of the screw, as described above. Thus, the ceramic material that has been pressured by the pressure portion can be smoothly led to the forward end extrusion port thereby to improve the extrusion rate.

This is considered to be due to the fact that the ceramic material increased in pressure by the pressure portion is pulled by the screws of the specific extended portion from the side of the forward end extrusion port instead of pushing it out toward the forward end port only by the extrusion pressure from behind.

The extend portion can produce the effect of diffusing the ceramic material uniformly as in the conventional diffusion portion. In addition, the extended portion according to this embodiment is comparatively long with an L/R ratio of not less than a specific value. Therefore, the rate at which the ceramic material is fed can be steadily increased over a great length, thereby making it possible to improve the fluidity of the ceramic material.

The improved fluidity due to the arrangement of the extended portion can improve the extrusion rate of the ceramic material even with the conventional drive system.

In the case under consideration, the extend portion has the feed rate of the ceramic material per revolution progressively increased toward the forward end extrusion port, with the L/R ratio, between the outer diameter R and the length L, set to not less than 1.0. In the case where the ratio L/R is less than 1.0, on the other hand, the extrusion rate of the ceramic material may not be sufficiently improved. The ratio L/R is more preferably not less than 1.5, or even more preferably 2.0 or more. The upper limit of the ratio is preferably not more than 4.0 to make sure that the need for a sizable reconstruction of the kneading portion, the filter portion and the drive system is eliminated.

According to a fourth aspect of the invention there is provided an extrusion molding apparatus, wherein the ratio of the feed rate per revolution at the back end ridge of the extended portion to the feed rate per revolution at the front end ridge of the pressure portion is preferably not less than 1.02.

In the case under consideration, the ratio (B/A) of the feed rate per revolution (B) at the back end ridge of the extended portion to the feed rate per revolution (A) at the front end ridge of the extended portion is not less than 1.02. Thus, the ceramic material that has been pressured in the pressure portion can be more smoothly led to the forward end extrusion port for an improved extrusion rate. As a result, the extrusion rate of the ceramic material can be improved even with the conventional drive system.

In the case where the ratio B/A is less than 1.02, on the other hand it is difficult to improve the extrusion rate. Preferably, the upper limit of the ratio is 4.0 to make sure that a sizable reconstruction of the kneading portion, the filter portion and the power system is not needed.

The feed rate per revolution of the front end ridge of the pressure portion is a simple value calculated from the screw size at the forward end of the pressure portion and defined as the rate at which the ceramic material is fed per revolution of the screws without taking into account the efficiency, etc.

The feed rate per revolution at the back ridge of the extended portion, on the other hand, is a simple value calculated from the screw size at the back end of the extended portion and defined as the feed rate of the ceramic material per revolution of the screws without taking into account the efficiency, etc. (refer to the embodiments).

According to a fifth aspect of the invention there is provided an extrusion molding apparatus, in which the ratio of the average feed rate at the ridge of the extended portion to the average feed rate at the ridge of the pressure portion is preferably not less than 1.02.

In the case under consideration, the ratio (D/C) of the food rate per revolution (D) at the ridge of the extended portion to the feed rate per revolution (C) at the ridge of the pressure portion is not less than 1.02. Thus, the ceramic material that has been pressured in the pressure portion can be smoothly led to the forward end extrusion port for an improved extrusion rate. As a result, the extrusion rate of the ceramic material can be improved even with the conventional drive system.

In the case where the ratio D/C is less than 1.02, on the other hand, it may be difficult to improve the extrusion rate. Preferably, the upper limit of the ratio is 4.0 due to make sure that a sizable reconstruction of the kneading portion, the filter portion and the power system is not needed.

The average feed rate per revolution of the ridge of the pressure portion is a simple value calculated from the screw size at the back end ridge and the front end ridge of the pressure portion and defined as one half of the sum of the two rates at which the ceramic material is fed per revolution of the screws for the two cases, without taking into account the efficiency, etc.

The average feed rate per revolution of the ridge of the extend portion, on the other hand, is a simple value calculated from the screw size at the back end ridge and the front end ridge of the extended portion and defined as one half of the sum of the two feed rates of the ceramic material per revolution of the screws for the two cases, without taking the efficiency, etc. into account.

According to a sixth aspect of the invention there is provided an extrusion molding apparatus, in which the feed rate per revolution of the kneading portion is preferably smaller than that of the forward end of the pressure portion and the base end of the extended portion.

In the case under consideration, the ceramic material that has been increased in pressure through the pressure portion is further increased in pressure through the kneading portion, and therefore the function of the extended portion can be exhibited even more effectively.

According to a seventh aspect of the invention there is provided an extrusion molding apparatus, in which a filter for filtering the ceramic material is arranged at the forward end extrusion port of the screw extruder, and the distance between the filter and the forward end of the screws is preferably between 1 mm and 30 mm inclusive.

In the case under consideration, the holding of a lump of ceramic material between the filter and the forward end of the screws is suppressed, thereby further improving the extrusion rate of the ceramic material.

In the case where the distance between the filter and the forward end of the screws is less than 1 mm, the lump of ceramic material or foreign matter held by the filter may come into contact with the forward end of the screws, and may damage the filter and the forward end of the screws.

A distance of more than 30 mm, on the other hand, would make it difficult to further improve the extrusion rate. The distance of 5 to 10 mm is thus more preferable.

According to an eighth aspect of the invention there is provided an extrusion molding apparatus in which a mold for a honeycomb structure is arranged on the side of the screw extruder near to the forward end extrusion port, whereby the ceramic honeycomb structure can be molded.

The ceramic honeycomb structure has a complicated shape with a multiplicity of cells, and has a very high extrusion pressure through the mold. An improved fluidity of the ceramic material due to the extended portion, therefore, contributes to an improved extrusion rate of the mold for a higher productivity.

According to a ninth aspect of the invention there is provided an extrusion molding apparatus comprising a screw extruder including a housing having screws built therein adapted to rotate so that the ceramic material introduced into the housing is extruded by way of the forward end extrusion port, wherein the screws built in the screw extruder include a pressure portion and an extend portion arranged at a position nearer to the forward end extrusion port than the pressure portion and having the feed rate per revolution progressively increased toward the forward end extrusion port.

In this aspect of the invention, the extend portion specifically described above is arranged following the pressure portion. Specifically, the extended portion has the feed rate per revolution progressively increased toward the forward end extrusion port.

The ceramic material delivered by extrusion from the pressure portion, therefore, can be positively extruded immediately toward the forward end extrusion port in the extended portion, thereby improving the extrusion rate of the ceramic material in the screw extruder.

In this way, the ceramic material can be led smoothly to the forward end extrusion port. Also, the provision of the extend portion at the forward end portion of the screws can produce the functions and effects described above, and therefore the drive system requires no sizable reconstruction.

In this aspect of the invention, the ceramic material, if sufficiently kneaded in the pressure portion or the like, need not be applied through the kneading portion but can be sent directly to the forward end extrusion port. Thus, the apparatus is simplified and the production cost of the extrusion molded product can be reduced.

Thus, this aspect of the invention provides an extrusion molding apparatus capable of improving the extrusion rate of the ceramic material without any sizable reconstruction of the drive system.

According to a tenth aspect of the invention there is provided an extrusion molding apparatus in which the pressure portion preferably has the feed rate per revolution progressively decreased toward the forward end extrusion port.

In the case under consideration, the pressure portion has the feed rate per revolution progressively decreased toward the forward end extrusion port, while the extended portion has the feed rate progressively increased toward the forward end extrusion port.

As a result, the ceramic material pressured in the pressure portion can be smoothly led toward the forward end extrusion port.

According to an 11th aspect of the invention there is provided an extrusion molding apparatus, in which the relation $L/R \geq 1.0$ holds preferably, where R is the outer diameter of the extended portion and L the length thereof.

In this case, as in the third aspect of the invention, the extended portion arranged at the forward end of the screws has a specific shape. Thus, the ceramic material pressured in the pressure portion can be led smoothly to the forward end extrusion port for an improved extrusion rate for the same reasons as described above for the third aspect.

According to a 12th aspect of the invention there is provided an extrusion molding apparatus, in which the ratio of the feed rate per revolution at the back end ridge of the extended portion to the feed rate per revolution at the front end ridge of the pressure portion is preferably not less than 1.02.

In the case under consideration, the ratio (B/A) of the feed rate per revolution (B) at the base end ridges of the extended portion to the feed rate per revolution (A) at the front end ridge of the pressure portion is not less than 1.02. Thus, the ceramic material that has been pressured in the pressure portion can be more smoothly led to the forward end extrusion port for an improved extrusion rate. As a result, the extrusion rate of the ceramic material can be improved even with the conventional drive system, for the same reasons described above for the fourth aspect.

According to a 13th aspect of the invention, there is provided an extrusion molding apparatus, in which the ratio of the average feed rate at the ridge of the extended portion to the average feed rate at the ridge of the pressure portion is not less than 1.02.

In the case under consideration, the ratio (D/C) of the average feed rate (D) at the ridges of the extended portion to the average feed rate (C) at the ridge of the pressure portion is not less than 1.02. Thus, the ceramic material that has been pressured in the pressure portion can be more smoothly led to the forward end extrusion port for an improved extrusion rate. As a result, the extrusion rate of the ceramic material can be improved even with the conventional drive system for the same reasons as described above for the fifth aspect of the invention.

According to a 14th aspect of the invention, there is provided an extrusion molding apparatus, in which a filter for filtering the ceramic material is arranged at the forward end extrusion port of the screw extruder, and the distance between the filter and the forward end of the screws is preferably between 1 mm and 30 mm inclusive.

In the case under consideration, the holding of a lump of ceramic material between the filter and the forward end of the screws is suppressed, thereby further improving the extrusion rate of the ceramic material for the same reasons as described above for the seventh aspect.

According to a 15th aspect of the invention there is provided an extrusion molding apparatus in which a mold for a honeycomb structure is arranged on the side of the screw extruder near to the forward end extrusion port, whereby the ceramic honeycomb structure can be molded.

The ceramic honeycomb structure has a complicated shape with a multiplicity of cells, and has a very high extrusion pressure through the mold. An improved fluidity of the ceramic material due to the extended portion, therefore, contributes to an improved extrusion rate of the mold for a higher productivity.

(Embodiment 1)

An extrusion molding apparatus according to an embodiment of the invention will be explained with reference to FIG. 1.

Figure 9:
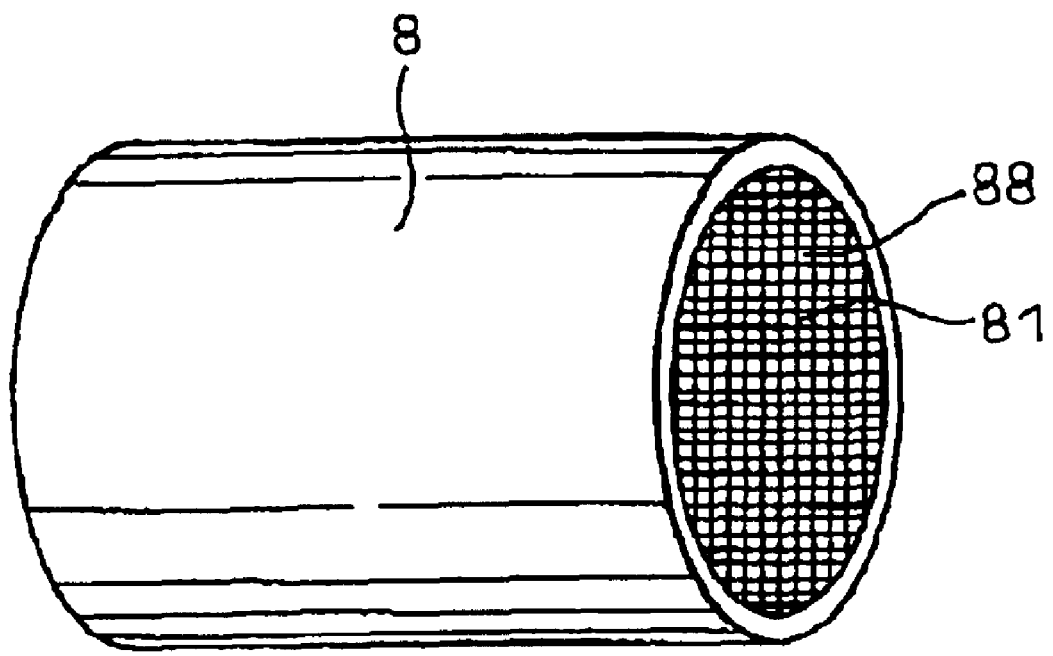
FIG. 9 is a diagram for explaining the structure of a honeycomb structure according to the prior art.

The extrusion molding apparatus 1 according to this embodiment is for producing a honeycomb structure 8 as shown in FIG. 9.

This extrusion molding apparatus 1 comprises screw extruders 2, 3 including housings 29, 39 having screws 4, 5 built therein, wherein the ceramic material 80 introduced into the housings 29, 39 is extruded by way of the forward end extrusion ports 68, 69 by rotating the screws 4, 5, respectively.

The screws 4, 5 built in the screw extruders 2, 3 include pressure portions 41, 51 with the feed rate per revolution progressively decreased toward the forward end extrusion port, and extended portions 43, 53, respectively, arranged nearer to the forward end extrusion port than the pressure portions 41, 51 and having the feed rate par revolution progressively increased toward the forward end extrusion port. The ratio L/R is set to 2.5 for both cases, where R is the outer diameter of the extended portions 43, 53 and L the length thereof.

Also, kneading portions 42, 52 having the feed rate per revolution smaller than that of the forward end of the pressure portion and the base end of the extend portion are arranged between the pressure portions 41, 51 and the extended portions 43, 53 of the screws 4, 5, respectively.

The pressure portions 41, 51 are composed of lead portions 410, 510 wound spirally in a single turn, with the distance between turns progressively decreased toward the forward extrusion port. The feed rate at the pressure portions 41, 51 can be changed by increasing the diameter of the axes 415, 515 progressively instead of adjusting the interval between the lead portions 410, 510. By employing one or both of the methods, the feed rate can be adjusted. In this embodiment, the interval between the lead portions 410, 510 is narrowed for this purpose.

The knead portions 42, 52 include a plurality of equidistantly arranged disk portions 420, 520 having forward and backward conical surfaces. The disk portions 420, 520 have notches not shown to slightly improve the fluidity of the ceramic material in the knead portions 42, 52.

The extended portions 43, 53 are composed of the lead portions 430, 530 wound spirally in a single turn, with the intervals of the turns progressively increased toward the forward end extrusion port. The feed rate at the extended portions 43, 53 can be changed by decreasing the diameter of the axes 435, 535 instead of adjusting the interval between the lead portions 430, 530. By employing one or both of the methods, the feed rate can be adjusted. In this embodiment, the interval between the lead portions 430, 530 is increased progressively while at the same time decreasing the axial diameters of the axial portions 435, 535 progressively.

The feed rates per revolution in the upper stage screw 4 have such a relation that assuming that the feed rate of the forward end of the pressure portion 41 is 1, the feed rate of the kneading portion 42 is almost 0; and the feed rate of the base end of the extended portion 43 is about 1.5.

The feed rates per revolution in the lower stage screw 5, on the other hand, have such a relation that assuming that the feed rate of the forward end of the pressure portion 51 is 1, the feed rate of the kneading portion 52 is almost 0, and the feed rate of the base end of the extended portion 53 is about 1.5.

In this embodiment, filters 62, 63 for filtering the ceramic material 80 are arranged at the forward end extrusion ports of the screw extruders 2, 3, respectively. The intervals between the filter portions 621, 631 of the filters 62, 63 and the forward ends of the screws 4, 5 are set to 10 mm for both cases.

Also, the upper screw extruder 2 and the lower screw extruder 3 are coupled to each other by way of a vacuum chamber 13, and a mold 11 for molding a honeycomb structure is connected through a resistance tube 12 to the forward end extrusion port of the lower screw extruder 3.

Further, the honeycomb structure 8, as shown in FIG. 9, is a solid cylindrical member composed of partitioning walls 81 formed of a ceramic material and rectangular cells 88 formed between the partitioning walls. A multiplicity of the cells are formed in the axial direction.

Now, the operation and effects of the present embodiment will be explained.

With the extrusion molding apparatus 1 according to this embodiment, as described above, the extended portions 43, 53 of a specific shape are arranged at the forward ends of the screws 4, 5, respectively. As a result, the ceramic material 80 pressured in the pressure portions 41, 51 can be led smoothly to the forward end extrusion ports 68, 69, respectively, for an improved extrusion rate.

Figure 10:
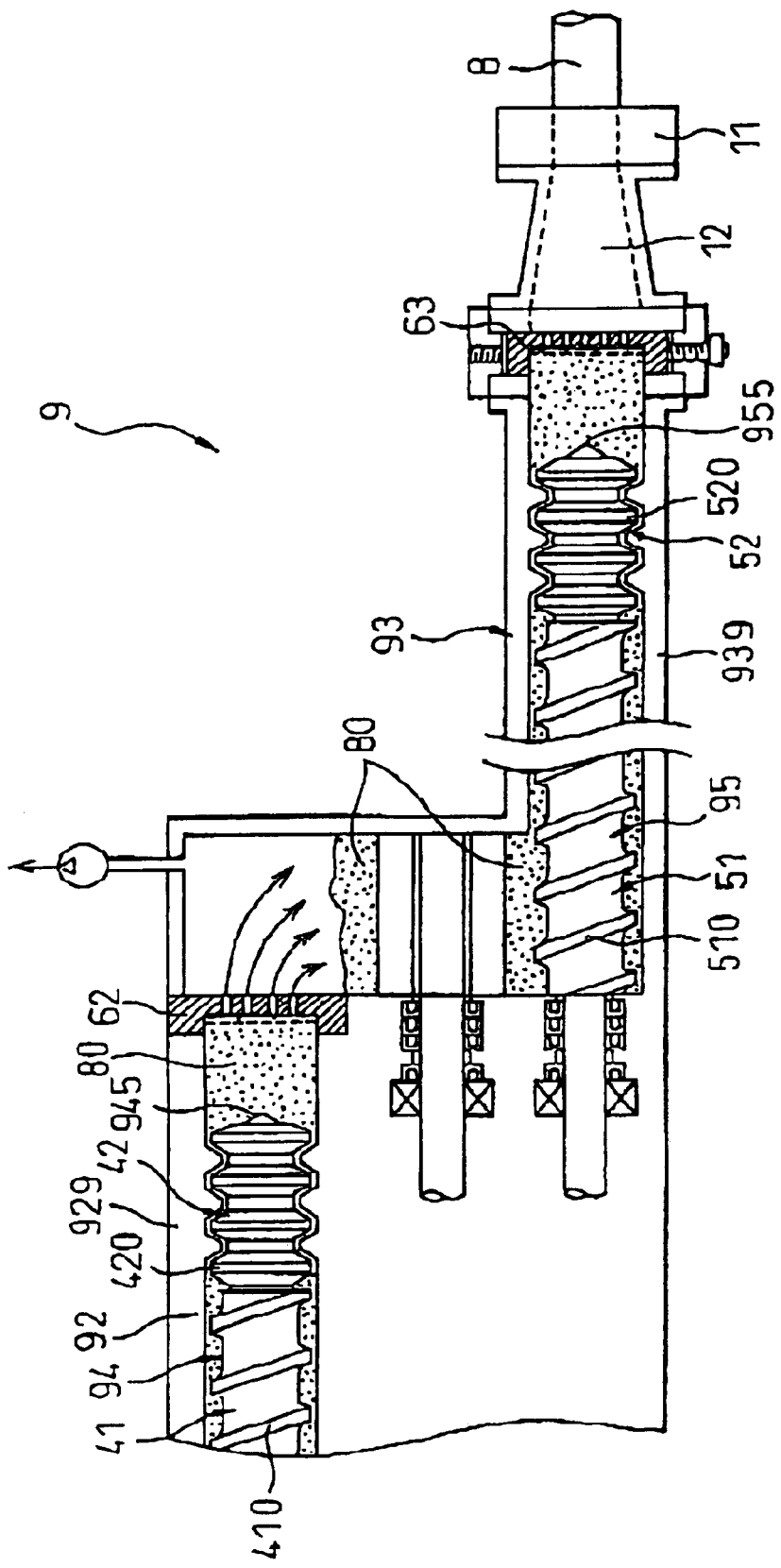
FIG. 10 is a diagram for explaining the configuration of an extrusion molding apparatus according to the prior art.

The extrusion rate of the extrusion molding apparatus 1 according to this embodiment and that of the conventional extrusion molding apparatus 9 (FIG. 10) were compared with each other by actually using them for molding the ceramic material 80 to form cordierite. The difference between the extrusion molding apparatus 1 according to this embodiment and the conventional extrusion molding apparatus 9 lies only in the configuration of the screws 4, 5 while the drive system is exactly the same for both apparatuses.

The extrusion rate of the honeycomb structure 8 using the extrusion molding apparatus 1 according to this embodiment is about three times higher than the feed rate of the conventional extrusion molding apparatus 9.

This is probably due to the fact that the ceramic material 80 increased in pressure by the pressure portions 41, 51 is not extruded toward the forward end extrusion port simply by the extrusion pressure from behind, but the effect of pull from the forward end port can be obtained by the specific extended portions 43, 53.

Further, according to this embodiment, the interval between the filters 62, 63 and the forward ends of the screws 4, 5 is set to 10 mm in the range of 1 to 30 mm, and therefore the holding of a lump of ceramic material can be suppressed, which contributes further to an improved extrusion rate of the ceramic material 80.

(Embodiment 2)

In this embodiment, as shown in FIG. 2, the extend portions 46, 56 each have two lead portions 461 (561), 462 (562), respectively, which are wound spirally in two turns. The other points are similar to the corresponding points of the first embodiment.

In the case under consideration, a further effect is exhibited for suppressing the holding of a lump of ceramic material or the like, as well as the effects similar to those of the first embodiment.

(Embodiment 3)

This embodiment, as shown in FIGS. 3 to 5, is associated with the ratio B/A and the ratio D/C at the pressure portion and the extend portion of the screw extruders 2, 3 according to the first embodiment.

In this embodiment, the screw 5 is taken up as a typical example. The screw extruder 3 according to this embodiment, as shown in FIG. 3, is arranged in a housing 39, and includes a pressure portion 51, a kneading portion 52 and an extend portion 53.

The pressure portion 51 has an axial portion 515 and a lead portion 510. Also, the knead portion 52 includes a disk portion 520. The extended portion 53, on the other hand, includes a lead portion 530.

The pressure portion 51 has back end ridge 517 at the boundary with the support shaft 500 for supporting the screws, and the front end ridge 518 at the boundary with the kneading portion 52. The extended portion 53, on the other hand, has back end ridge 537 at the boundary with the kneading portion 52, and the front end ridge 538 near the forward extrusion end port. The outer diameter of the extended portion 53, i.e. the outer diameter of the lead portion 530 of the extended portion 53 is given as R, and the length of the extended portion 53, i.e. the length from the back end ridge 537 of the extended portion to the front end ridge 538 of the extended portion is given as L.

According to this embodiment, the ratio of the feed rate (B) per revolution of the screw at the back end ridge 537 of the extended portion to the feed rate (A) per revolution of the screw at the front end ridge 518 of the pressure portion is set to not less than 1.02.

FIG. 4 shows the change of feed rate at the pressure portion and the extended portion, i.e. the change of feed rate between the back end ridge 517 of the pressure portion and the front end ridge 518 of the pressure portion, and the change of feed rate between the back end ridge 537 of the extended portion and the the front end ridge 538 of the extended portion of the screw extruder 3 having the aforementioned configuration. The feed rate shown in FIG. 4 represents the case in which the feed rate at the front end ridge 518 of the pressure portion is assumed to be 1.0.

From FIG. 5, it is seen that the ratio B/A of the feed rate (B) per revolution at the back end ridge of the extended portion to the feed rate (A) per revolution at the front end ridge of the pressure portion is 1.02.

Also, FIG. 5 shows the average feed rate at the pressure portion 51 and the extended portion 53. From FIG. 5, it is seen that the average feed rate (C) at the pressure portion ridges is 1.0, and the average feed rate (D) at the extended portion ridge is 1.02, the ratio D/C being 1.02.

In the case under consideration, the ratio B/A is set to not less then 1.02. Thus, the ceramic material that has been pressured in the pressure portion can be smoothly led to the forward end extrusion port for an improved extrusion rate. As a result, the extrusion rate of the ceramic material can be improved even with the conventional drive system.

Also, the ratio D/C is not less than 1.02, and therefore, a similar effect to that of the previous case is obtained.

The other points are similar to the corresponding points of the first embodiment, and the same effects are produced as in the first embodiment.

(Embodiment 4)

Figure 6:
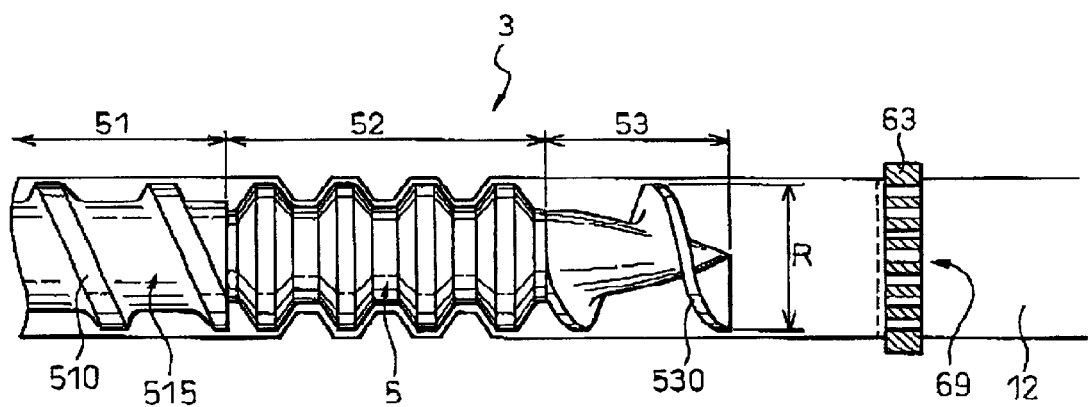
FIG. 6 is a diagram for explaining a screw structure according to a fourth embodiment.

According to this embodiment, as shown in FIG. 6, the lead portion 530 of the screw of the extended portion 53 is spiraled in a single turn in the first embodiment.

Figure 7:
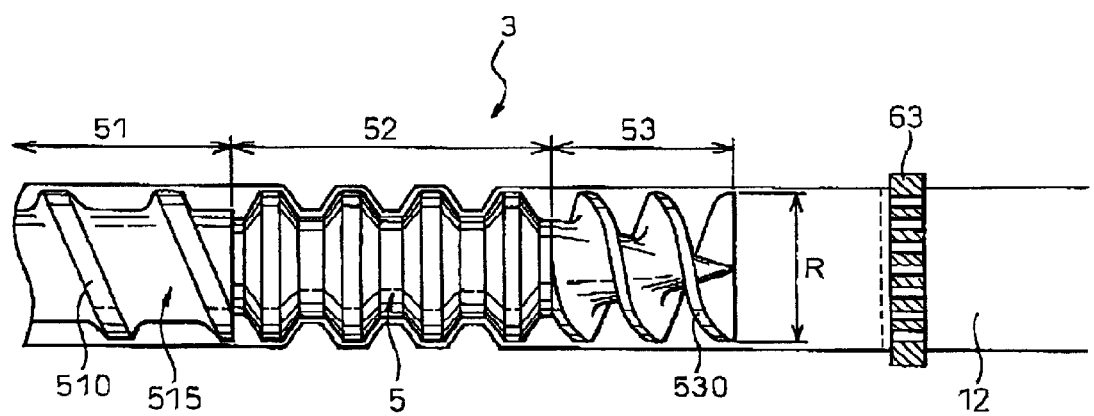
FIG. 7 is a diagram for explaining another screw structure according to the fourth embodiment.

As another example, as shown in FIG. 7, the lead portion 530 Of the screw of the extended portion 53 is spiraled in two turns.

The other points are similar to the corresponding points of the first embodiment. The embodiment shown in FIG. 6 can produce the same effects as the first embodiment, and the embodiment of FIG. 7 the same effects as the second embodiment.

(Embodiment 5)

Figure 8:
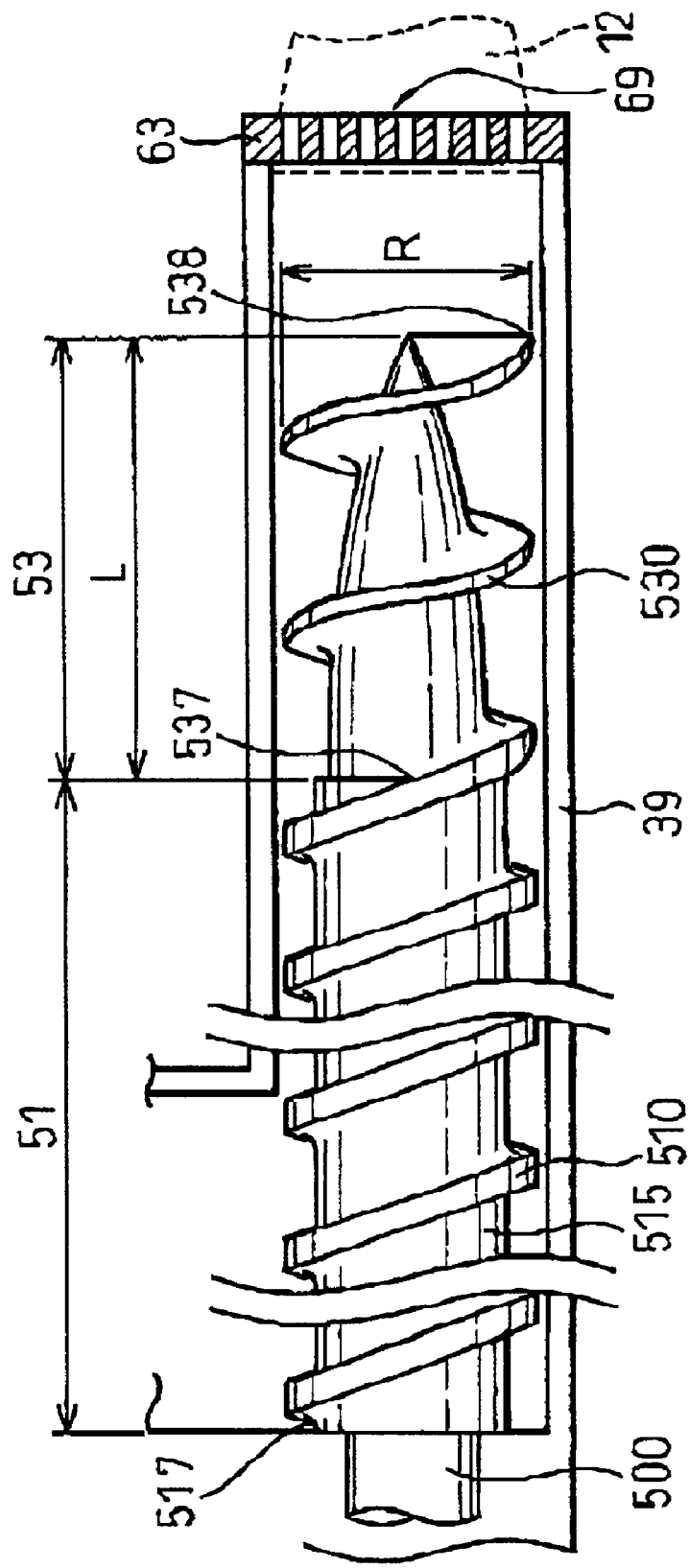
FIG. 8 is a diagram for explaining a screw structure according to a fifth embodiment.

In this embodiment, as shown in FIG. 8, the pressure portion 51 and the extend portion 53 are arranged continuously.

Specifically, in the screw extruder according to this embodiment, the kneading portion 52 in the third embodiment is omitted, and the extend portion 53 is arranged immediately downstream of the pressure portion 51. The other points are similar to the corresponding points of the third embodiment.

As a result, the ceramic material that has been extruded from the pressure portion 51 can be positively extruded toward the forward end extrusion port 69 immediately by the extended portion 53, thereby making it possible to increase the extrusion rate of the ceramic material from the screw extruder.

In this way, the ceramic material can be led smoothly to the forward end extrusion port 69. Also, the provision of the extended portion 53 at the forward end portion of the screw produces the aforementioned functions and effects, and therefore the need of sizable reconstruction of the drive system is eliminated.

In the case where the ceramic material is already sufficiently kneaded in the pressure portion or the like, it can be sent to the forward end extrusion port without being applied through the kneading portion. Therefore, the apparatus can be simplified and the production cost of the extrusion molded products can be reduced.

What is claimed is:

1. An extrusion molding apparatus comprising a housing, the housing including a screw built into the housing, a ceramic material being introduced into the housing and extruded by way of a forward end extrusion port by rotating the screw, wherein:

the screw includes a pressure portion, an extended portion arranged on a forward end extrusion port side of the pressure portion, and a kneading portion arranged between the pressure portion and the extended portion for kneading the ceramic material; and the pressure portion has a feed rate per revolution which progressively decreases toward the forward end extrusion port, and the extended portion has a feed rate per revolution which progressively increases toward the forward end extrusion port.

2. An extrusion molding apparatus according to claim 1, in which the relation $L/R \geq 1.0$ holds, where R is an outer diameter of the extended portion and the L is a length thereof.

3. An extrusion molding apparatus according to claim 1, wherein the ratio of the feed rate per revolution at a back end ridge of the extended portion to the feed rate per revolution at a front end ridge of the pressure portion is not less than 1.02.

4. An extrusion molding apparatus according to claim 1, in which the ratio of the average feed rate at a ridge of the extended portion to the average feed rate at a ridge of the pressure portion is not less than 1.02.

5. An extrusion molding apparatus according to claim 1, in which the feed rate per revolution of the kneading portion is smaller than that of a forward end of the pressure portion and a back end of the extended portion.

6. An extrusion molding apparatus according to claim 1, in which a filter for filtering the ceramic material is arranged at the forward end extrusion port of the housing, and a distance between the filter and a forward end of the screw is between 1 mm and 30 mm inclusive.

7. An extrusion molding apparatus according to claim 1, in which a mold for a honeycomb structure is arranged on a side of the housing near to the forward end extrusion port, whereby a ceramic honeycomb structure is molded.

8. An extrusion molding apparatus comprising a screw extruder including a housing having screws built therein adapted to rotate so that a ceramic material introduced into the housing is extruded by way of a forward end extrusion port, wherein:

the screws built in the screw extruder include a pressure portion and an extended portion arranged at a position nearer to the forward end extrusion port than the pressure portion and having a feed rate per revolution which progressively increases toward the forward end extrusion port; and the pressure portion has a feed rate per revolution which progressively decreases toward the forward end extrusion port.

9. An extrusion molding apparatus according to claim 8, in which the relation $L/R \geq 1.0$ holds and where R is an outer diameter of the extended portion and L is a length thereof.

10. An extrusion molding apparatus according to claim 8, in which the ratio of the feed rate per revolution at a back end ridge of the extended portion to the feed rate per revolution at a front end ridge of the pressure portion is not less than 1.02.

11. An extrusion molding apparatus according to claim 8, in which the ratio of the average feed rate at a ridge of the extended portion to the average feed rate at a ridge of the pressure portion is not less than 1.02.

12. An extrusion molding apparatus according to claim 8, in which a filter for filtering the ceramic material is arranged at the forward end extrusion port of the screw extruder, and a distance between the filter and a forward end of the screws is between 1 mm and 30 mm inclusive.

13. An extrusion molding apparatus according to claim 8, in which a mold for a honeycomb structure is arranged on a side of the screw extruder near to the forward end extrusion port, whereby a ceramic honeycomb structure is molded.

\* \* \* \* \*